Feb. 5, 1935.  H. R. TEAR  1,989,719
LUBRICATING DEVICE
Filed Dec. 30, 1932
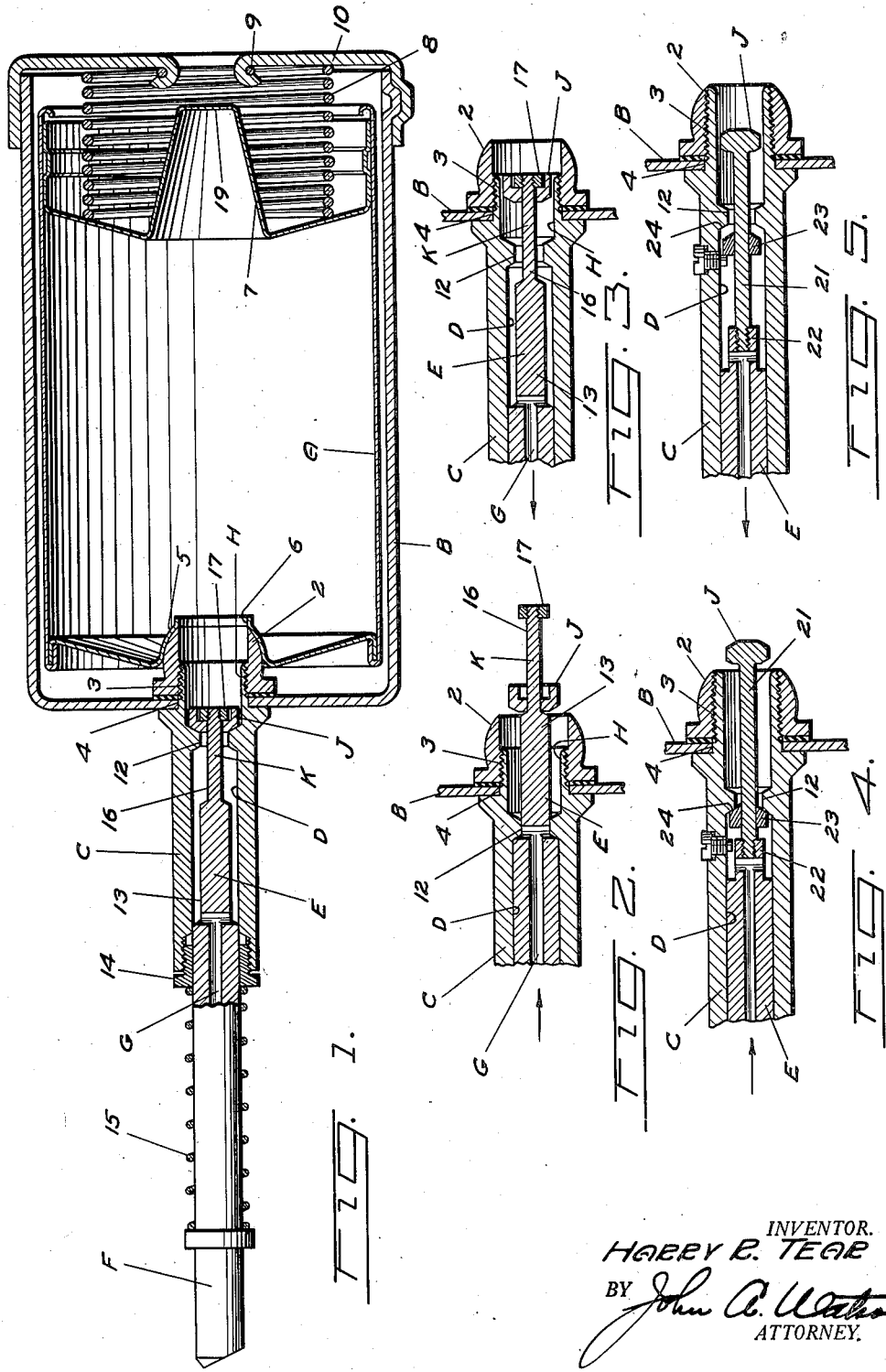
INVENTOR.
HARRY R. TEAR
BY John A. Watson
ATTORNEY.

Patented Feb. 5, 1935

1,989,719

UNITED STATES PATENT OFFICE 1,989,719

LUBRICATING DEVICE

Harry R. Tear, South Bend, Ind., assignor to The Lubrication Corporation, Chicago, Ill., a corporation of Delaware Application December 30, 1932, Serial No. 649,462

13 Claims. (Cl. 221—47.4)

This invention relates to improvements in lubricating devices and more particularly to lubricant guns and pressure feed lubricant pumps for use in discharging of lubricant into bearings or other similar mechanism under relatively high pressures.

One of the inherent characteristics of a relatively high pressure gun or pump, particularly those of the hand operated type, is that the piston displacement for a given length of stroke shall be relatively low, thereby giving preference to the use of cylinders of relatively small diameter and consequent small piston displacement. In the past the charging of high pressure cylinders with lubricant has been accomplished by urging the lubricant from the pump or gun reservoir into the cylinder through the medium of a spring or air pressure applied to a piston within the reservoir so that the lubricant may be maintained under a constant relatively low pressure. It has also been the practice to depend upon the differential in pressure between the high pressure cylinder and the reservoir at atmospheric pressure to accomplish the charging function. I have found, however, that in many cases, more particularly where a heavy bodied lubricant is to be employed, that the slight differential in pressure between the high pressure cylinder and the reservoir has been insufficient to accomplish a complete charging of the high pressure cylinder during the retractile stroke of the high pressure piston in some such manner as described, thereby decreasing the efficiency of the gun by cutting down the amount of lubricant available in the high pressure cylinder for discharge. Furthermore, where a differential in pressure is relied upon to charge the high pressure cylinder it often occurs that air from air pockets within the reservoir seeks its way into the high pressure cylinder thereby greatly reducing the lubricant pressure which may be built up during the power stroke of the high pressure piston.

An object of the invention is to provide a high pressure lubricant gun or feed pump having positive means for charging the high pressure cylinder.

Another object is to provide a lubricant pressure feed device wherein the thrust applied for the purpose of retracting the high pressure piston is employed to carry out the charging operation.

A further object is to provide a lubricant gun or pump which is simple in construction and in which its charging function is not likely to become impaired through continued and strenuous usage.

Other objects, the advantages, and uses of the invention will be, or should become, apparent after reading the following description and claims and after consideration of the accompanying drawing forming a part of this specification, in which:

Fig. 1 is a sectional view of a hand lubricant gun, of the push type, constructed in accordance with the invention;

Fig. 2 is a fragmentary sectional view of the charging mechanism at the end of the pressure stroke of the high pressure piston;

Fig. 3 is a fragmentary sectional view illustrating the mechanism of Fig. 2 during the charging operation;

Fig. 4 is a view similar to Fig. 2 of another form of the charging mechanism, and Fig. 5 is a view similar to Fig. 3 of the mechanism of Fig. 4.

In general, the hand lubricant gun selected for illustration herein comprises a cartridge A providing a source of lubricant supply, located within the barrel B affixed to the body C of the gun, a high pressure cylinder D within the body C, a piston plunger E mounted for reciprocation within the cylinder D, a lubricant discharge nozzle F at the outer end of the plunger E and communicating with the cylinder D through a bore G extending through the plunger, a charging cylinder H formed coaxially with the cylinder D, a charging piston J mounted for reciprocation into and within the cylinder H, and means K for operating the piston J upon reciprocation of the plunger E.

Referring particularly to Fig. 1 of the drawing, communication between the cartridge A and the cylinder D may be afforded by a cartridge connector stud 2 secured by threaded engagement 3 to that portion of the body C extending within the barrel B through an opening 4 provided therefor. The outer wall of the stud 2 may be substantially spherical for sealing engagement with the complementary wall surface 5 of the outlet opening 6 of the cartridge A. A piston 7 located within the cartridge A may be arranged to bear upon the lubricant contents of the cartridge through the medium of a compression spring 8 one end of which is secured at 9 to a removable cap 10 forming the remote end wall of the barrel.

The charging cylinder H communicates directly with the interior of the cartridge B and is separated from the high pressure cylinder D by an annular flange 12 the internal diameter of which is identical, except for operating clearance, with the diametrically reduced portion 13 of the plunger E. The forward end of the cylinder D may be provided with a packing and bushing assembly 14 to provide a lubricant tight seal between the outer wall of the plunger E and the cylinder D. A compression spring 15 located about the outer wall of the plunger E is disposed between the packing assembly 14 and the nozzle F for urging the plunger to its retracted position as shown in Fig. 1.

The charging piston J is slidably mounted upon a diametrically reduced rearwardly extending portion 16 of the plunger E. An enlarged head 17 is formed in the remote end of the plunger extension 16 so as to cause the piston J to move inwardly of the charging cylinder H during the latter portion of the retractile movement of the plunger. The arrangement between the piston J and the plunger E is that of a lost-motion link and is employed because of the intentional increased displacement of the piston J in the charging cylinder H with respect to that of the plunger E within the cylinder D during any given stroke. The linkage thus formed is preferably designed with the extension 16 sufficiently short as to cause the lubricant within the cylinder H to be displaced in a slightly greater amount than the capacity of the cylinder D at the end of the retractile stroke may accommodate. This feature assures full and complete charging of the high pressure cylinder D during each retractile stroke.

With reference to Fig. 2 the piston plunger E is shown at the end of its pressure stroke which is accomplished by holding the gun by the barrel B with the nozzle F engaged with a lubricant receiving fitting and by application of thrust to the barrel to cause the barrel and cylinder assembly to move forwardly relative to the plunger E. The actual pressure producing function of the gun does not occur until the diametrically reduced portion 13 of the plunger engages with the walls of the annular flange 12 of the body C after which lubricant in the annular space between the piston plunger and cylinder walls is expelled through the passageway G under relatively high pressure through the nozzle and into the fitting. When the parts assume the position of Fig. 2 the charging piston J will lie within the body of the lubricant contents of the cartridge A exteriorly of the charging cylinder H. If manual thrust is now released from the barrel B the spring 15 will urge the barrel and cylinder assembly rearwardly, carrying the piston J through the medium of lubricant within the cartridge until it engages with the head 17 of the extended portion 16 of the plunger. Continued retractile movement of the plunger E or rearward movement of the barrel B and cylinder assembly will cause the lubricant within the cartridge A to be urged toward and into the cylinder D. When relative movement between the cylinder assembly and plunger has occurred in an amount sufficient to cause the piston J to enter the charging cylinder H, the parts appear as shown in Fig. 3 and thereafter continued relative retractile movement between the plunger and cylinder assembly will cause the lubricant within the charging cylinder H to be forced into the cylinder D so as to completely charge the cylinder for the next cycle of operation.

It will be noted that the piston 7 is provided with a centrally depressed portion 19 to accommodate the inwardly projected portion of the charging piston J and plunger extension 16 as the contents of the cartridge become exhausted.

It may be seen, therefore, that a lubricant gun constructed as herein described undergoes a charging of its high pressure cylinder which is or may be wholly independent of a differential in pressure between the high pressure cylinder and the cartridge A, or the lubricant contents of its supply reservoir if the mechanism be incorporated in a lubricant feed pump with associated reservoir, and that the charging of the cylinder becomes automatic during each retractile stroke of the high pressure piston plunger. The gun, therefore, may be expected to operate more efficiently because of the maintenance of its maximum capacity during each discharge cycle, and therefore the work done to transfer a given quantity of lubricant from the cartridge to a lubricant receiving fitting or receptacle is minimized.

In Figs. 4 and 5 another form of charging mechanism is illustrated wherein the charging piston J is rigidly connected with the plunger E and therefore fixed against longitudinal movement relative thereto. To this end the piston J may be provided with a forwardly extending rod-like extension 21 secured to the rearward end of the plunger E by threaded engagement as shown at 22. A valve member 23 slidably mounted upon the member 21 is adapted to bear upon a seat 24 formed on the forward side walls of the annular flange 12 of the cylinder body so that during the power stroke of the plunger as shown in Fig. 4 the valve is closed and lubricant within the cylinder D discharged through the bore G. During the retractile stroke, as shown in Fig. 5, the piston J operates precisely in the same manner as its counterpart described in connection with Fig. 1 except that there is no lost motion between the plunger and the piston.

It should be noted that in both embodiments shown that the piston J and cylinder H unlike a piston and cylinder in the more common sense of the terms are so designed as to allow clearance between the adjacent piston and cylinder walls. This form of the charging instrumentality is preferred chiefly because of the relatively heavy body of the lubricant usually dispensed by the gun.

It is to be understood that the embodiments of the invention herein set forth are presented for the purpose of illustration only and various changes may be made therein without departing from the spirit and scope of the invention.

I claim:

1. In a lubrication device, a cylinder having an inlet passageway, a plunger mounted for reciprocation in said cylinder, a source of lubricant supply, and means including a lost motion connection with said plunger for urging lubricant from said supply source through said passageway into said cylinder during the retractile stroke of the plunger.

2. A lubricating device comprising a pump cylinder having an inlet passageway, a plunger mounted for reciprocation in said cylinder, means normally retaining said plunger in its retracted position, a lubricant supply reservoir, and means for injecting lubricant into said cylinder during the retractile stroke of said piston, said means including a member associated with said plunger and movable between the interior of said inlet passageway and the interior of said reservoir.

3. In a lubricating device a pump cylinder, a source of lubricant supply communicating with said cylinder, a plunger mounted for reciprocation in said cylinder, a piston associated with said plunger and spaced apart therefrom for entry into the lubricant in said supply source and further arranged to follow said plunger during its retractile stroke to urge lubricant from said supply source into said cylinder.

4. A hand lubricant gun comprising, a lubricant supply reservoir, a pump cylinder in substantial alignment with said reservoir and communicating therewith, a plunger mounted for reciprocation in said cylinder, and means connected with said plunger and adapted to travel between said reservoir and said cylinder during the suction stroke of said plunger to conduct lubricant from the reservoir into the cylinder, said means having a piston-like head.

5. A hand lubricant gun comprising, a lubricant supply reservoir, a pump cylinder in substantial alignment with said reservoir and communicating therewith, a plunger mounted for reciprocation in said cylinder, and means operated by said plunger and adapted to travel from within said reservoir toward said cylinder during the retractile movement of said plunger to conduct lubricant from the reservoir into the cylinder.

6. A hand lubricant gun comprising, a lubricant supply reservoir, a pump cylinder in substantial alignment with said reservoir and communicating therewith, a plunger mounted for reciprocation in said cylinder, and a piston carried by said plunger and adapted to travel from within said reservoir toward said cylinder during the retractile movement of said plunger to conduct lubricant from the reservoir into the cylinder.

7. A lubricating device comprising, a cylinder, a plunger mounted for reciprocation in said cylinder, a lubricant reservoir, means providing a passageway between said cylinder and said reservoir, a valve for closing said passageway during the pressure stroke of said plunger, and a piston member fixed to said plunger and arranged to travel into and out of the reservoir and said cylinder during operation of the plunger to urge lubricant from within the reservoir into said cylinder, the travel of said piston member into said reservoir being arranged to occur while the plunger is on its discharge stroke.

8. A lubricating device comprising, a pump cylinder, a charging cylinder and a lubricant reservoir in series array, a plunger mounted for reciprocation in said pump cylinder, a cylinder charging piston for said charging cylinder, and means connecting said charging piston with said pump plunger to cause said charging piston to move from within said reservoir into and within said charging cylinder during each retractile movement of said pump plunger.

9. In a pump for pumping lubricants and the like, a cylinder, a piston reciprocatable in said cylinder for discharging lubricants therefrom, a reservoir connected with said cylinder by a passageway, means for reciprocating said piston, and means operated in timed relation to the motion of said piston and movable from within said reservoir into said passageway and toward said cylinder for positively charging the cylinder on a suction stroke of said piston.

10. In a pump for pumping lubricants and the like, a cylinder, a piston reciprocatable in said cylinder for discharging lubricants therefrom, a reservoir connected with said cylinder by a passageway, means for reciprocating said piston, means reciprocatable between a place within said passageway and a place within said reservoir for urging lubricant toward said plunger cylinder during a suction stroke of said piston, and means for operating said reciprocatable means.

11. In a pump for pumping lubricants and the like, a cylinder, a piston reciprocatable in said cylinder for discharging lubricants therefrom, a reservoir connected with said cylinder by a passageway, means for reciprocating said piston, and means movable from within said passageway into said reservoir on a discharge stroke of said piston and from within said reservoir into said passageway on a suction stroke of said piston for priming said pump cylinder.

12. In a pump for pumping lubricants and the like, a pump cylinder, a piston reciprocatable in said cylinder for discharging lubricants therefrom, a lubricant reservoir, means providing a passageway for lubricants to flow from said reservoir to said cylinder, means movable from said passageway into said reservoir on a discharge stroke of said piston and from within said reservoir toward said passageway on a suction stroke of said piston, and means for operating said movable means.

13. In a lubricant pump, a cylinder, a plunger mounted for reciprocation in said cylinder, a lubricant reservoir, means providing a lubricant passageway between said cylinder and said reservoir, a piston-like member arranged to travel between a place within said reservoir and a place in said passageway for urging lubricant from the reservoir toward said cylinder, and means for operating said plunger and member in timed relation to one another so that the member is entering said reservoir while the plunger is on a discharge stroke.

HARRY R. TEAR.

CERTIFICATE OF CORRECTION

Patent No. 1,989,719. February 5, 1935.

HARRY R. TEAR.

It is hereby certified that error appears in the printed specification of the above numbered patent requiring correction as follows: Page 3, second column, line 20, claim 10, for "plunger" read pump; and that the said Letters Patent should be read with this correction therein that the same may conform to the record of the case in the Patent Office.

Signed and sealed this 14th day of January, A. D. 1936.

Leslie Frazer (Seal) Acting Commissioner of Patents.